United States Patent
Zhou et al.

(10) Patent No.: US 9,045,690 B2
(45) Date of Patent: Jun. 2, 2015

(54) SILICATE LUMINESCENT MATERIAL AND PRODUCTION METHOD THEREOF

(75) Inventors: Mingjie Zhou, Guangdong (CN);
Qiurong Liao, Guangdong (CN);
Wenbo Ma, Guangdong (CN)

(73) Assignee: Ocean's King Lighting Science & Technology Co., Ltd., Guangdong (CN)

( * ) Notice: Subject to any disclaimer, the term of this patent is extended or adjusted under 35 U.S.C. 154(b) by 326 days.

(21) Appl. No.: 13/638,668

(22) PCT Filed: Apr. 28, 2010

(86) PCT No.: PCT/CN2010/072286
§ 371 (c)(1),
(2), (4) Date: Oct. 1, 2012

(87) PCT Pub. No.: WO2011/134148
PCT Pub. Date: Nov. 3, 2011

(65) Prior Publication Data
US 2013/0020534 A1    Jan. 24, 2013

(51) Int. Cl.
*C09K 11/79* (2006.01)
*C09K 11/77* (2006.01)
*C09K 11/59* (2006.01)

(52) U.S. Cl.
CPC ........... *C09K 11/7774* (2013.01); *C09K 11/595* (2013.01)

(58) Field of Classification Search
USPC ................................... 252/301.4 F, 301, 4 R
See application file for complete search history.

(56) References Cited

U.S. PATENT DOCUMENTS

| 5,951,915 A | 9/1999 | Hase et al. |
| 2008/0237539 A1 | 10/2008 | Chen et al. |
| 2009/0315448 A1 | 12/2009 | Kuze et al. |

FOREIGN PATENT DOCUMENTS

| CN | 1470597 | * | 1/2004 |
| CN | 1470597 A | | 1/2004 |
| CN | 101077973 A | | 11/2007 |
| JP | 2006-206631 A | | 8/2006 |

OTHER PUBLICATIONS

Translation for CN 1470597, Jan. 2004.*
Lin et al, "Luminescence and Energy Transfer of Rare -earth-metal Ions in Mg2Y8(SiO4)6O2", J. Mat. Chem., 5(8), Jan. 1995, pp. 1151-1154.*

(Continued)

*Primary Examiner* — Carol M Koslow
(74) *Attorney, Agent, or Firm* — Renner, Otto, Boisselle & Sklar, LLP

(57) ABSTRACT

A silicate luminescent material and the production method thereof are provided. The chemical formula of the silicate luminescent material is $Re_{4-x}Tb_xMgSi_3O_{13}$, wherein Re is at least one element selected from the group consisting of Y, Gd, La, Lu and Sc, and $0.05 \leq x \leq 1$. The silicate luminescent material has a short afterglow of 2.13 ms, and it can emit strong green light under the vacuum ultraviolet excitation. Additionally, the silicate luminescent material has stable physical and chemical properties. The production method for producing the silicate luminescent material is simple and cost-efficient.

6 Claims, 3 Drawing Sheets

(56) References Cited

OTHER PUBLICATIONS

Chung et al, "Preparation and Photoluminescence Properties of Novel Color-Tunable MgY4Si3O13:Cr3+,Tb3+ Phosphors for Ultraviolet Ligh-Emitting Diodes", J. Am. Ceram. Soc., 93 (7), Mar. 1, 2010, pp. 1838-1841.*
Extended European Search Report for corresponding European Application No. 10850481.2 dated Feb. 6, 2013.
Chung et al., "Preparation and Photoluminescence Properties of Novel Color-Tunable MgY4Si3O13:Ce3+, Tb3+ Phosphors for Ultraviolet Light-Emitting Diodes", Journal of the American Ceramic Society, vol. 93, No. 7, Mar. 1, 2010; pp. 1838-1841.
Yamane et al., "Synthesis and Characterization of Ca(La,Gd)4Si3O13:Tb Green PDP Phosphor for VUV Excitation", IDW/AD, PHp - 12, Jan. 1, 2005, pp. 555-558.
International Search Report for corresponding International Application No. PCT/CN2010/072286 mailed Feb. 10, 2011.
Communication pursuant to Article 94(3) EPC in corresponding European Application No. 10850481.2 dated Dec. 22, 2014.
Huang et al., "Matrix-inducing synthesis and luminescence of novel unexpected coral-like morphology Mg2Gd8(SiO4) 6O3:Tb3+ nanophosphor from in situ composing multicomponent hybrid precursors", Inorganic Chemistry Communications 7, 2004, pp. 919-922.
Lin et al., Luminescence and Energy Transfer of Rare-earth-metal Ions in Mg2Y8(SiO4)6O2, Journal of Materials Chemistry, vol. 5, No. 8, 1995, pp. 1151-1154.

\* cited by examiner

SILICATE LUMINESCENT MATERIAL AND PRODUCTION METHOD THEREOF

This application is a national phase of International Application No. PCT/CN2010/072286 filed Apr. 28, 2010.

FIELD OF THE INVENTION

The present invention relates to the technical field of luminescent material, particularly to a silicate luminescent material and production method thereof.

BACKGROUND OF THE INVENTION

In recent years, with an increasing demand for lighting devices and display devices in the market, luminescent materials have become one of the competed hot topics of research and development. So far, a variety of luminescent materials have been developed and utilized, such as organic electroluminescent materials, photoluminescent materials, cathode ray excited luminescent materials, and ultraviolet radiation excited luminescent materials. These different kinds of luminescent materials can be applied in corresponding lighting devices, display devices etc, respectively.

For example, plasma display panel is a kind of novel direct-view type image display device following the development of cathode ray tube and liquid crystal display. Plasma display panel has the advantages of active emitting, high brightness, large viewing angle, high contrast ratio, good color reproduction, abundant gray scale and fast response, and has become an important technology for flat panel display requiring a large panel and a high definition. The luminescent mechanism of plasma display panel is as follows: due to the discharge of an inert gas such as Xe or Xe—He, said inert gas is then turned into a plasma status which emits vacuum ultraviolet radiations at 147 nm and 172 nm which in turn excite the fluorescent powder coated on the inner wall to emit lights of the three primary colors, i.e. red, green and blue. A color display can be achieved by spatial color mixing and circuit control.

Currently, $Zn_2SiO_4:Mn^{2+}$ is one of the most commonly used green fluorescent powder in plasma display panel. When excited by vacuum ultraviolet radiations, $Zn_2SiO_4:Mn^{2+}$ exhibits excellent brightness, excellent deterioration resistance and fast-to-reach saturated brightness. However, the afterglow period of $Zn_2SiO_4:Mn^{2+}$ is too long, which has an adverse effect on fast displayed images. Furthermore, the dielectric constant of $Zn_2SiO_4:Mn^{2+}$ is higher than that of the red and blue fluorescent powders used in plasma display panels, and thus a greater inducing voltage is required for driving display devices such as plasma display panel.

Currently, a novel green fluorescent powder is under study in order to meet all the requirements of plasma display panels. Such a novel green fluorescent powder comprises mainly $Mn^{2+}$ excited aluminate, for example, $BaMgAl_{10}O_{17}:Mn^{2+}$ fluorescent powder, $Ba_{0.9}Mg_{0.6}Mn_{0.16} \cdot 8Al_2O_3$ green fluorescent powder and the like. These novel green fluorescent powders have a lower dielectric constant. However, since $Mn^{2+}$ is used as the activator, these novel fluorescent powders still exhibit a relatively long afterglow period, and the luminescent brightness of these fluorescent powders is relatively low.

DISCLOSURE OF THE INVENTION

Technical Problems of the Invention

In this connection, the present invention provides a silicate luminescent material having a short afterglow period and high luminescent brightness.

Furthermore, the present invention provides a method for producing the silicate luminescent material, which is simple and cost-effective.

Technical solution of the invention

A silicate luminescent material is provided, which has a chemical formula of $Re_{4-x}Tb_xMgSi_3O_{13}$, wherein Re is at least one element selected from Y, Gd, La, Lu and Sc, and $0.05 \leq x \leq 1$.

In addition, a method for producing the silicate luminescent material is provided, said method comprises the steps of:

providing a source compound of each element according to the molar ratio defined in the chemical formula $Re_{4-x}Tb_xMgSi_3O_{13}$, wherein Re in said chemical formula is at least one element selected from Y, Gd, La, Lu and Sc, and $0.05 \leq x \leq 1$;

mixing the source compounds of the elements;

subjecting the mixture of the source compounds of the elements to a pre-calcination treatment;

subjecting the pre-calcinated product to calcination under a reducing atmosphere, followed by cooling and then milling to obtain the silicate luminescent material.

The Beneficial Effects of the Invention

The above-mentioned silicate luminescent material and the production method thereof possess at least one of the following advantages.

(1) The silicate luminescent material has a short afterglow period of about 2.13 ms, which is much shorter than that of the commercial $Zn_2SiO_4:Mn^{2+}$.

(2) The silicate luminescent material uses $Re_4MgSi_3O_{13}$ as the matrix, into which Tb ions are doped. Said matrix exhibits a strong absorption to vacuum ultraviolet radiations. Due to the activation of Tb ions, the luminescent material exhibits relatively strong green emission when excited by vacuum ultraviolet radiations.

(3) The silicate luminescent material is very stable, and shows no substantial changes in its properties even after being subjected to treatments like water immersion, and high-temperature heating, etc.

(4) The method for producing the silicate luminescent material is achieved mainly by precalcination and calcinations. The process is simple and easy to realize the industrialization, and has a broad prospect in production.

BRIEF DESCRIPTION OF THE DRAWINGS

The present invention will be further described referring to the drawings and Examples, in which.

PREFERRED EMBODIMENTS OF THE PRESENT INVENTION

Figure 1:
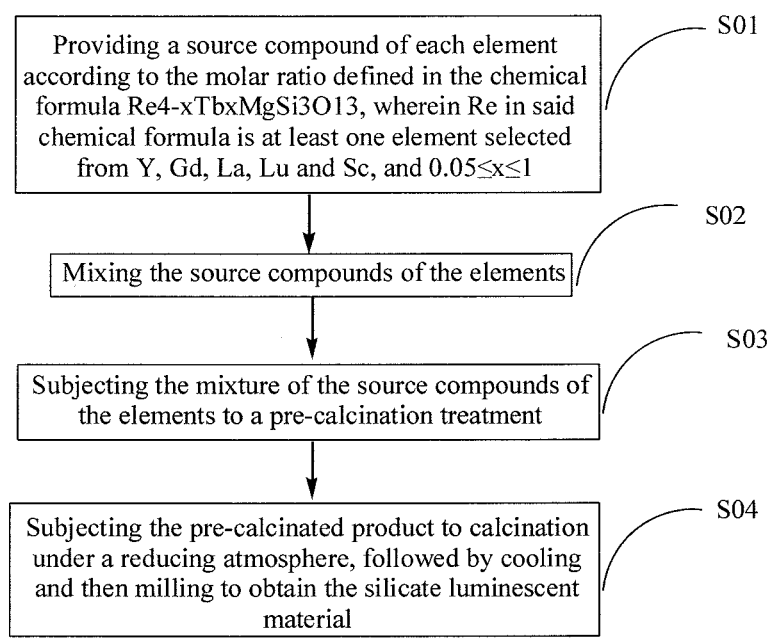
FIG. 1 is a flowchart of the method for producing the silicate luminescent material of the Examples of the present invention.

In order to make the objects, the technical solutions and the advantages of the invention more apparent, the present invention will be further described referring to the drawings and Examples. It should be understood that the embodiments described herein are merely illustration of the invention and shall not be construed as limiting the invention.

The silicate luminescent materials of the examples of the present invention has a chemical formula of $Re_{4-x}Tb_xMgSi_3O_{13}$, wherein Re is at least one element selected from Y, Gd, La, Lu and Sc, and $0.05 \leq x \leq 1$. Among them, Re may be a combination of two or more elements selected from Y, Gd, La, Lu and Sc, for example a combination of Y and Gd, a combination of the four elements, Y, Gd, La, Lu. Through a combination of these different elements, optical properties of theses different elements are fully utilized, such that high luminescent brightness can be achieved. Preferably, x is 0.1-0.5, by which a more appropriate doping amount of Tb ions can be achieved.

In the above-mentioned silicate luminescent material, $Re_4MgSi_3O_{13}$ is used as the matrix, into which Tb ions are doped. Said matrix exhibits a strong absorption to vacuum ultraviolet radiations. Due to the activation of Tb ions, the luminescent material exhibits relatively strong green emission when excited by vacuum ultraviolet radiations, and thus exhibits a relatively high luminescent brightness. Specifically, when excited by vacuum ultraviolet radiations, the matrix of the silicate luminescent material absorbs energy, and transfers it to the Tb ions that act as the emission centers, and green light emission is generated from Tb ions. The silicate luminescent material shows relatively strong absorptions at 147 nm and 172 nm, thereby enhancing its luminous intensity. Accordingly, the silicate luminescent material is suitable for use in devices such as plasma display panels.

The silicate luminescent material has at least the following advantages:

(1) The silicate luminescent material has a short afterglow period of about 2.13 ms, which is much shorter than that of the commercial $Zn_2SiO_4:Mn^{2+}$.

(2) The silicate luminescent material uses $Re_4MgSi_3O_{13}$ as the matrix, into which Tb ions are doped. Said matrix exhibits a strong absorption to vacuum ultraviolet radiations. Due the activation of Tb ions, the luminescent material exhibits relatively strong green emission when excited by vacuum ultraviolet radiations.

(3) The silicate luminescent material is very stable, and shows no substantial changes in its properties even after being subjected to treatments like water immersion, and high-temperature heating, etc.

Refer to FIG. 1, which illustrates a flowchart of the method for producing the silicate luminescent material of the Examples of the present invention, said method comprising the following steps:

S01: providing a source compound of each element according to the molar ratio defined in the chemical formula $Re_{4-x}Tb_xMgSi_3O_{13}$, wherein Re in said chemical formula is at least one element selected from Y, Gd, La, Lu and Sc, and $0.05 \leq x \leq 1$;

S02: mixing the source compounds of the elements;

S03: subjecting the mixture of the source compounds of the elements to a pre-calcination treatment;

S04: subjecting the pre-calcinated product to calcination under a reducing atmosphere, followed by cooling and then milling to obtain the silicate luminescent material.

In step S01, in the source compounds of the above elements, the source compound of Re is preferably at least one of oxides, carbonates, oxalates and nitrates thereof, the source compound of Tb is preferably at least one of oxides, carbonates, oxalates and nitrates thereof, the source compound of magnesium is at least one of magnesium oxide, magnesium carbonate, magnesium oxalate and magnesium nitrate, the source compound of silicon is silicon dioxide. Preferably, x is 0.1-0.5.

Step S02 comprises the processes of adding boric acid into the mixture of the source compounds of the above elements in an amount of 0.5-5 mol % based on the molar amount of $Re_{4-x}Tb_xMgSi_3O_{13}$ or Mg ions and then milling for mixing. The mixing is specifically preformed as follows: adding boric acid, followed by sufficiently milling the mixture in a mortar to achieve homogenous mixing before proceeding to step S03.

Specifically, step S03 comprises the process of pre-calcinating the mixture of the source compounds of the elements in air for 1-8 hours at a temperature of 1000-1400° C. The temperature of pre-calcination is preferably 1100-1300° C., and the time of pre-calcination is preferably 2-6 hours.

Specifically, step S04 comprises the processes of milling the pre-calcinated product, and calcinating it for 1-8 hours under a reducing atmosphere at a temperature of 1100-1500° C. The temperature of calcination is preferably 1250-1400° C., and the time of calcination is preferably 2-6 hours. More specifically, the temperature of calcination is higher than that of pre-calcination, for example, by about 100-350° C., and the total time of pre-calcination and calcination is preferably 5-12 hours. The reducing atmosphere may be an atmosphere formed by a mixed gas of nitrogen and hydrogen in a volume ratio of 95:5, carbon monoxide gas or hydrogen, etc. The precalcination treatment may also be called a thermal treatment, while the calcinations treatment may also be called a sintering treatment.

In addition, the calcinated product may be further milled into powders, followed by screening to give the fluorescent powder having a certain particle size.

In the above production method, the silicate luminescent material can be readily obtained by the pre-calcination treatment and the calcination treatment. The entire production process is simple and cost-effective.

Different compositions of the silicate luminescent materials and the production method thereof as well as the properties thereof are exemplified in the following Examples.

Example 1

Green Fluorescent Powder with the Composition of $Y_{3.95}Tb_{0.05}MgSi_3O_{13}$ 1.975 mol of $Y_2O_3$, 0.0125 mol of $Tb_4O_7$, 1 mol of MgO and 3 mol of $SiO_2$ are weighed, and 0.005 mol of $H_3BO_3$ is added as the co-flux. These powders are placed in an agate mortar and sufficiently milled until a homogenous mixture is obtained. The resulted powder is then transferred to a corundum crucible, and placed in a muffle furnace for thermal treatment at 1000° C. for 2 hours, followed by sintering and reducing under a weak reducing atmosphere of 95% $N_2$+5% $H_2$ in a tube furnace at 1350° C. for 3 hours, and cooling to room temperature. After milling, a white product, namely the green fluorescent powder $Y_{3.95}Tb_{0.05}MgSi_3O_{13}$, is obtained.

Example 2

Green Fluorescent Powder with the Composition of $La_{3.9}Tb_{0.1}MgSi_3O_{13}$ 1.95 mol of $La_2O_3$, 0.025 mol of $Tb_4O_7$, 1 mol of MgO and 3 mol of $SiO_2$ are weighed, and 0.01 mol of $H_3BO_3$ is added as the co-flux. These powders are placed in an agate mortar for sufficient milling until a homogenous mixture is obtained.

The resulted powder is then transferred to a corundum crucible, and placed in a muffle furnace for thermal treatment at 1200° C. for 5 hours, followed by sintering and reducing under a weak reducing atmosphere of 95% $N_2$+5% $H_2$ in a tube furnace at 1400° C. for 1 hour, and cooling to room temperature. After milling, a white product, namely the green fluorescent powder $La_{3.9}Tb_{0.1}MgSi_3O_{13}$, is obtained.

Example 3

Green Fluorescent Powder with the Composition of $Sc_{3.5}Tb_{0.5}MgSi_3O_{13}$ 1.75 mol of $Sc_2O_3$, 0.125 mol of $Tb_4O_7$, 1 mol of MgO and 3 mol of $SiO_2$ are weighed, and 0.02 mol of $H_3BO_3$ is added as the co-flux. These powders are placed in an agate mortar for sufficient milling until a homogenous mixture is obtained. The resulted powder is then transferred to a corundum crucible, and placed in a muffle furnace for thermal treatment at 1300° C. for 1 hour, followed by sintering and reducing under a weak reducing atmosphere of 95% $N_2$+5% $H_2$ in a tube furnace at 1450° C. for 3 hours, and cooling to room temperature. After milling, a white product, namely the green fluorescent powder $Sc_{3.5}Tb_{0.5}MgSi_3O_{13}$, is obtained.

Example 4

Green Fluorescent Powder with the Composition of $Gd_{3.2}Tb_{0.8}MgSi_3O_{13}$ 1.6 mol of $Gd_2O_3$, 0.2 mol of $Tb_4O_7$, 1 mol of MgO and 3 mol of $SiO_2$ are weighed, and 0.05 mol of $H_3BO_3$ is added as the co-flux. These powders are placed in an agate mortar for sufficient milling until a homogenous mixture is obtained. The resulted powder is then transferred to a corundum crucible, and placed in a muffle furnace for thermal treatment at 1400° C. for 6 hours, followed by sintering and reducing under a weak reducing atmosphere of 95% $N_2$+5% $H_2$ in a tube furnace at 1500° C. for 1 hour, and cooling to room temperature. After milling, a white product, namely the green fluorescent powder $Gd_{3.2}Tb_{0.8}MgSi_3O_{13}$, is obtained.

Example 5

Green Fluorescent Powder with the Composition of $Lu_3TbMgSi_3O_{13}$ 1.5 mol of $Lu_2O_3$, 0.25 mol of $Tb_4O_7$, 1 mol of MgO and 3 mol of $SiO_2$ are weighed, and 0.05 mol of $H_3BO_3$ is added as the co-flux. These powders are placed in an agate mortar for sufficient milling until a homogenous mixture is obtained. The resulted powder is then transferred to a corundum crucible, and placed in a muffle furnace for thermal treatment at 1000° C. for 8 hours, followed by sintering and reducing under a weak reducing atmosphere of 95% $N_2$+5% $H_2$ in a tube furnace at 1250° C. for 7 hours, and cooling to room temperature. After milling, a white product, namely the green fluorescent powder $Lu_3TbMgSi_3O_{13}$, is obtained.

Example 6

Green Fluorescent Powder with the Composition of $Y_3Gd_{0.5}Tb_{0.5}MgSi_3O_{13}$ 1.5 mol of $Y_2O_3$, 0.25 mol of $Gd_2O_3$, 0.125 mol of $Tb_4O_7$, 1 mol of MgO and 3 mol of $SiO_2$ are weighed, and 0.03 mol of $H_3BO_3$ is added as the co-flux. These powders are placed in an agate mortar for sufficient milling until a homogenous mixture is obtained. The resulted powder is then transferred to a corundum crucible, and placed in a muffle furnace for thermal treatment at 1300° C. for 5 hours, followed by sintering and reducing under a weak reducing atmosphere of 95% $N_2$+5% $H_2$ in a tube furnace at 1400° C. for 3 hours, and cooling to room temperature. After milling, a white product, namely the green fluorescent powder $Y_3Gd_{0.5}Tb_{0.5}MgSi_3O_{13}$, is obtained.

Example 7

Green Fluorescent Powder with the Composition of $La_{1.5}Sc_{0.5}Lu_{1.5}Tb_{0.5}MgSi_3O_{13}$ 0.75 mol of $La_2O_3$, 0.25 mol of $Sc_2O_3$, 0.75 mol of $Lu_2O_3$, 0.125 mol of $Tb_4O_7$, 1 mol of $MgCO_3$ and 3 mol of $SiO_2$ are weighed, and 0.02 mol of $H_3BO_3$ is added as the co-flux. These powders are placed in an agate mortar for sufficient milling until a homogenous mixture is obtained. The resulted powder is then transferred to a corundum crucible, and placed in a muffle furnace for thermal treatment at 1400° C. for 1 hour, followed by sintering and reducing under a weak reducing atmosphere of 95% $N_2$+5% $H_2$ in a tube furnace at 1350° C. for 8 hours, and cooling to room temperature. After milling, a white product, namely the green fluorescent powder $La_{1.5}Sc_{0.5}Lu_{1.5}Tb_{0.5}MgSi_3O_{13}$, is obtained.

Example 8

Green Fluorescent Powder with the Composition of $Y_3Lu_{0.3}Tb_{0.7}MgSi_3O_{13}$ 3 mol of $Y(NO_3)_3$, 0.3 mol of $Lu(NO_3)_3$, 0.175 mol of $Tb_4O_7$, 1 mol of $MgCO_3$ and 3 mol $SiO_2$ are weighed, and 0.01 mol of $H_3BO_3$ is added as the co-flux. These powders are placed in an agate mortar for sufficient milling until a homogenous mixture is obtained. The resulted powder is then transferred to a corundum crucible, and placed in a muffle furnace for thermal treatment at 1000° C. for 2 hours, followed by sintering and reducing under a weak reducing atmosphere of 95% $N_2$+5% $H_2$ in a tube furnace at 1450° C. for 4 hours, and cooling to room temperature. After milling, a white product, namely the green fluorescent powder $Y_3Lu_{0.3}Tb_{0.7}MgSi_3O_{13}$, is obtained.

Example 9

Green Fluorescent Powder with the Composition of $YLaGdLu_{0.5}Tb_{0.5}MgSi_3O_{13}$ 1 mol of $Y(NO_3)_3$, 1 mol of $La(NO_3)_3$, 1 mol of $Gd(NO_3)_3$, 0.5 mol of $Lu(NO_3)_3$, 0.125 mol of $Tb_4O_7$, 1 mol of MgO and 3 mol of $SiO_2$ are weighed, and 0.008 mol of $H_3BO_3$ is added as the co-flux. These powders are placed in an agate mortar for sufficient milling until a homogenous mixture is obtained. The resulted powder is then transferred to a corundum crucible, and placed in a muffle furnace for thermal treatment at 1100° C. for 3 hours, followed by sintering and reducing under a weak reducing atmosphere of 95% $N_2$+5% $H_2$ in a tube furnace at 1500° C. for 2 hours, and cooling to room temperature. After milling, a white product, namely the green fluorescent powder $YLaGdLu_{0.5}Tb_{0.5}MgSi_3O_{13}$, is obtained.

Example 10

Green Fluorescent Powder with the Composition of $Y_{3.6}Gd_{0.1}Sc_{0.1}Tb_{0.2}MgSi_3O_{13}$ 1.8 mol of $Y_2O_3$, 0.1 mol of $Gd(NO_3)_3$, 0.1 mol of $Sc(NO_3)_3$, 0.05 mol of $Tb_4O_7$, 1 mol of $MgCO_3$ and 3 mol of $SiO_2$ are weighed, and 0.05 mol of $H_3BO_3$ is added as the co-flux. These powders are placed in an agate mortar for sufficient milling until a homogenous mixture is obtained. The resulted powder is then transferred to a corundum crucible, and placed in a muffle furnace for thermal treatment at 1200° C. for 6 hours, followed by sintering and reducing under a weak reducing atmosphere of 95% $N_2$+5% $H_2$ in a tube furnace at 1350° C. for 8 hours, and cooling to room temperature. After milling, a white product, namely the green fluorescent powder $Y_{3.6}Gd_{0.1}Sc_{0.1}Tb_{0.2}MgSi_3O_{13}$, is obtained.

In the following, taking the luminescent material $Y_3Gd_{0.5}Tb_{0.5}MgSi_3O_{13}$ of Example 6 as an example, the excitation spectrum, emission spectrum and fluorescence decay of the luminescent material are studied in order to illustrate the luminescent properties of the luminescent material of the present invention.

Figure 2:
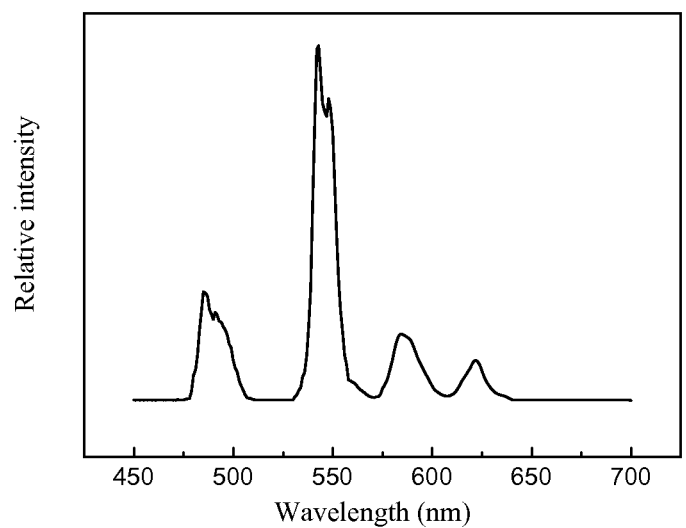
FIG. 2 is an emission spectrum of the silicate luminescent material of Example 6 of the present invention, wherein the excitation wavelength is 172 nm.

Refer to FIG. 2, which shows the emission spectrum of the luminescent material $Y_3Gd_{0.5}Tb_{0.5}MgSi_3O_{13}$ obtained in Example 6 above. As illustrated, the luminescent material prepared in Example 6 emits under the excitation at 172 nm, and shows a strong absorption peak at around 543 nm, and the integral intensity of said emission spectrum is relatively high. Such spectral results demonstrate relatively strong luminescent properties and relatively high brightness of the material.

Figure 3:
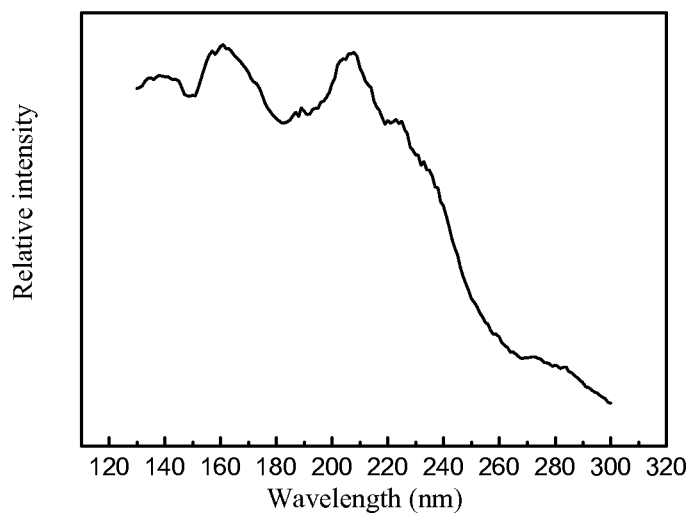
FIG. 3 is an excitation spectrum of the silicate luminescent material of Example 6 of the present invention, wherein the monitoring wavelength is 543 nm.

Refer to FIG. 3, which shows the excitation spectrum of the luminescent material $Y_3Gd_{0.5}Tb_{0.5}MgSi_3O_{13}$ obtained in Example 6 above. As illustrated, the luminescent material $Y_3Gd_{0.5}Tb_{0.5}MgSi_3O_{13}$ shows a relatively strong absorption to the ultraviolet radiation of around 172 nm, which demonstrates that the luminescent material has a good absorption in the range of vacuum ultraviolet wavelengths.

Figure 4:
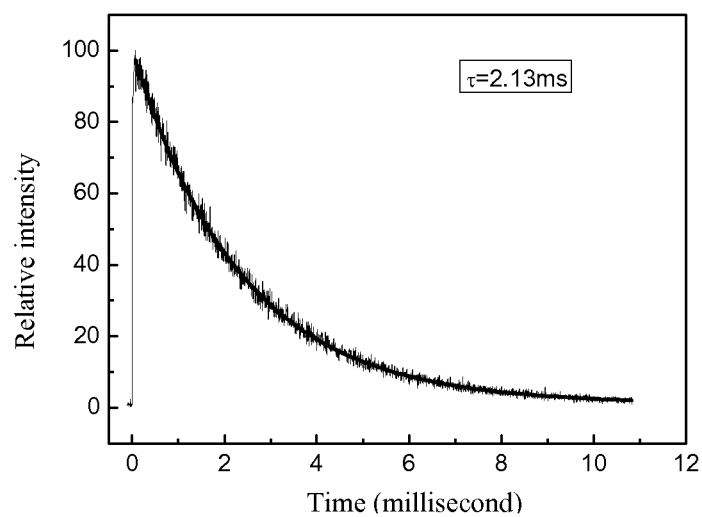
FIG. 4 is the fluorescence decay curve of the silicate luminescent material of Example 6 of the present invention.

Refer to FIG. 4, which shows the fluorescence decay curve of the luminescent material $Y_3Gd_{0.5}Tb_{0.5}MgSi_3O_{13}$ obtained in Example 6 above. As illustrated in the figure, the afterglow period of said material is 2.13 ms, which is much shorter than that of the commercial green powder currently available. For example, the afterglow period of the material $Zn_2SiO_4$:$Mn^{2+}$ is 7.1 ms, which demonstrates that the material of the present invention has a shorter afterglow period and a shorter fluorescence life time.

From the test results of the luminescent properties of the luminescent material of Example 6, it can be seen that the silicate luminescent material has a short afterglow period of about 2.13 ms which is much lower than that of the commercial $Zn_2SiO_4$:$Mn^{2+}$, and exhibits a relatively strong green emission when excited by vacuum ultraviolet radiations. In addition, the silicate luminescent material has stable physical and chemical properties which show no substantial changes even after being subjected to treatments like water immersion and high-temperature heating. In the method for producing the silicate luminescent material, the silicate luminescent material can be readily obtained by pre-calcination and calcinations. Therefore, the method is simple and cost-effective and has a broad prospect in production.

Described above are merely preferred embodiments of the present invention, and are not intended to limit the present invention. Any modification, equivalent replacement and improvement made without departing from the spirit and principle of the present invention shall be encompassed in the protection scope of the present invention.

What is claimed is:

1. A method for producing a silicate luminescent material, comprising the steps of:
   providing a source compound of each element according to the molar ratio defined in the chemical formula $Re_{4-x}Tb_xMgSi_3O_{13}$, wherein Re in said chemical formula is at least one element selected from Y, Gd, La, Lu and Sc, and $0.05 \leq x \leq 1$;
   mixing the source compounds of the elements;
   subjecting the mixture of the source compounds of the elements to a pre-calcination treatment;
   subjecting the pre-calcinated product to calcination under a reducing atmosphere, followed by cooling and then milling to obtain the silicate luminescent material,
   wherein said pre-calcination treatment comprises the process of pre-calcinating the mixture of the source compounds of the elements in air for 1-8 hours at a temperature of 1000-1400° C.

2. The method for producing a silicate luminescent material according to claim 1, wherein said calcination comprises the process of milling the pre-calcinated product, and calcinating it for 1-8 hours under a reducing atmosphere at a temperature of 1100-1500° C.

3. The method for producing a silicate luminescent material according to claim 1, wherein the step of mixing the source compounds of the elements comprises adding boric acid into the mixture in an amount of 0.5-5 mol % based on the molar amount of $Re_{4-x}Tb_xMgSi_3O_{13}$ and then milling for mixing.

4. The method for producing a silicate luminescent material according to claim 1, wherein, in the source compounds of the elements, the source compound of Re is at least one of oxides, carbonates, oxalates and nitrates thereof, the source compound of Tb is at least one of oxides, carbonates, oxalates and nitrates thereof, the source compound of magnesium is at least one of magnesium oxide, magnesium carbonate, magnesium oxalate and magnesium nitrate, and the source compound of silicon is silicon dioxide.

5. The method for producing a silicate luminescent material according to claim 1, wherein the reducing atmosphere is an atmosphere formed by a mixed gas of nitrogen and hydrogen in a volume ratio of 95:5, carbon monoxide gas or hydrogen.

6. The method for producing a silicate luminescent material according to claim 1, wherein the temperature of calcination is higher than the temperature of pre-calcination by 100-350° C.

* * * * *